(12) United States Patent
Salapura et al.

(10) Patent No.: US 9,286,067 B2
(45) Date of Patent: Mar. 15, 2016

(54) METHOD AND APPARATUS FOR A HIERARCHICAL SYNCHRONIZATION BARRIER IN A MULTI-NODE SYSTEM

(75) Inventors: Valentina Salapura, Chappaqua, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 13/614,460

(22) Filed: Sep. 13, 2012

(65) Prior Publication Data
US 2013/0013891 A1 Jan. 10, 2013

Related U.S. Application Data

(63) Continuation of application No. 12/987,523, filed on Jan. 10, 2011, now abandoned.

(51) Int. Cl.
*G06F 9/52* (2006.01)
*G06F 9/30* (2006.01)
*G06F 9/38* (2006.01)

(52) U.S. Cl.
CPC .......... *G06F 9/30087* (2013.01); *G06F 9/3851* (2013.01); *G06F 9/522* (2013.01)

(58) Field of Classification Search
CPC ....................................................... G06F 9/522
USPC ......................................................... 712/220
See application file for complete search history.

(56) References Cited

U.S. PATENT DOCUMENTS

| | | | |
|---|---|---|---|
| 5,434,995 A * | 7/1995 | Oberlin et al. | 713/375 |
| 5,490,261 A | 2/1996 | Bean et al. | |
| 5,706,464 A | 1/1998 | Moore et al. | |
| 5,721,921 A | 2/1998 | Kessler et al. | |

(Continued)

FOREIGN PATENT DOCUMENTS

| | | |
|---|---|---|
| JP | 2000215182 A | 8/2000 |
| WO | 96/37834 | 11/1996 |

OTHER PUBLICATIONS

U.S. Office Action mailed Mar. 7, 2013 in related U.S. Appl. No. 13/008,498.

(Continued)

*Primary Examiner* — Andrew Caldwell
*Assistant Examiner* — Keith Nielsen
(74) *Attorney, Agent, or Firm* — Scully, Scott, Murphy & Presser, P.C.; Daniel P. Morris, Esq.

(57) ABSTRACT

A hierarchical barrier synchronization of cores and nodes on a multiprocessor system, in one aspect, may include providing by each of a plurality of threads on a chip, input bit signal to a respective bit in a register, in response to reaching a barrier; determining whether all of the plurality of threads reached the barrier by electrically tying bits of the register together and "AND"ing the input bit signals; determining whether only on-chip synchronization is needed or whether inter-node synchronization is needed; in response to determining that all of the plurality of threads on the chip reached the barrier, notifying the plurality of threads on the chip, if it is determined that only on-chip synchronization is needed; and after all of the plurality of threads on the chip reached the barrier, communicating the synchronization signal to outside of the chip, if it is determined that inter-node synchronization is needed.

16 Claims, 5 Drawing Sheets

(56) References Cited

U.S. PATENT DOCUMENTS

| | | | |
|---|---|---|---|
| 5,790,530 A | 8/1998 | Moh et al. | |
| 5,812,811 A | 9/1998 | Dubey et al. | |
| 5,928,351 A | 7/1999 | Horie et al. | |
| 5,937,194 A | 8/1999 | Sundaresan | |
| 6,047,316 A | 4/2000 | Barton et al. | |
| 6,549,989 B1 | 4/2003 | Arimilli et al. | |
| 6,988,170 B2 | 1/2006 | Barroso et al. | |
| 7,100,021 B1 | 8/2006 | Marshall et al. | |
| 7,200,717 B2 | 4/2007 | Guthrie et al. | |
| 7,454,570 B2 | 11/2008 | Dunshea et al. | |
| 7,657,880 B2 | 2/2010 | Wang et al. | |
| 7,673,011 B2 | 3/2010 | Archer et al. | |
| 7,721,009 B2 | 5/2010 | Moreira et al. | |
| 7,734,706 B2 | 6/2010 | Archer et al. | |
| 7,793,044 B1 | 9/2010 | Spracklen et al. | |
| 8,307,194 B1* | 11/2012 | Scott et al. | 712/34 |
| 2002/0147872 A1 | 10/2002 | Steele et al. | |
| 2002/0174299 A1 | 11/2002 | Hayter et al. | |
| 2004/0078493 A1 | 4/2004 | Blumrich et al. | |
| 2004/0154010 A1 | 8/2004 | Marcuello et al. | |
| 2004/0154011 A1 | 8/2004 | Wang et al. | |
| 2005/0027941 A1 | 2/2005 | Wang et al. | |
| 2005/0097300 A1 | 5/2005 | Gildea et al. | |
| 2006/0161741 A1 | 7/2006 | Yasue et al. | |
| 2006/0184771 A1 | 8/2006 | Floyd et al. | |
| 2007/0006047 A1 | 1/2007 | Zhou et al. | |
| 2007/0113232 A1* | 5/2007 | Collard et al. | 718/101 |
| 2007/0174558 A1 | 7/2007 | Jia et al. | |
| 2007/0180310 A1 | 8/2007 | Johnson et al. | |
| 2008/0077921 A1 | 3/2008 | Chaudhary et al. | |
| 2008/0178177 A1* | 7/2008 | Archer et al. | 718/100 |
| 2008/0215861 A1 | 9/2008 | Aamodt et al. | |
| 2008/0282032 A1 | 11/2008 | Shen et al. | |
| 2008/0282064 A1 | 11/2008 | Day et al. | |
| 2008/0288750 A1* | 11/2008 | Clift et al. | 712/202 |
| 2009/0055627 A1 | 2/2009 | Giacomoni et al. | |
| 2009/0063811 A1 | 3/2009 | Arimilli et al. | |
| 2009/0070617 A1* | 3/2009 | Arimilli et al. | 713/400 |
| 2009/0083493 A1 | 3/2009 | Kinter | |
| 2009/0172306 A1 | 7/2009 | Nussbaum et al. | |
| 2009/0193228 A1 | 7/2009 | Kasahara et al. | |
| 2009/0282474 A1 | 11/2009 | Chen et al. | |
| 2010/0088472 A1 | 4/2010 | Ukai | |

OTHER PUBLICATIONS

Prvulovic et al., ReEnact: using thread-level speculation mechanisms to debug data races in multithreaded codes, May 2003, ACM, Proceedings of the30th annual international symposium on Computer architecture, pp. 110-121 (reprinted pp. 1-12).

Prvulovic et al., ReVive: Cost-Effective Architectural Support for Rollback Recovery in Shared-Memory Multiprocessors, May 2002, ISCA '02 Proceedings of the 29th annual international symposium on Computer architecture, pp. 111-122.

Mukherjee et al., Detailed design and evaluation of redundant multithreading alternatives, May 2002, ISCA '02 Proceedings of the 29th annual international symposium on Computer architecture, pp. 99-110.

Torrellas, Hardware Support for Reliability, 2003, University of Illinois at Urbana-Champaign, Engineering, Course Material, CS 533, pp. 1-34.

U.S. Office Action mailed in related U.S. Appl. No. 13/020,228 on Apr. 30, 2013.

Pjesivac-Grbovic et al., Performance analysis of MPI collective operations, Mar. 15, 2007, Science Business Media LLC, p. 127-143.

U.S. Official Action mailed Jul. 23, 2013 in related U.S. Appl. No. 13/611,985.

Office Action dated Feb. 4, 2014 received in a related U.S. Patent Application, namely U.S. Appl. No. 12/987,523.

Office Action dated Mar. 4, 2015 received in U.S. Appl. No. 13/020,228.

U.S. Office Action mailed Jun. 25, 2013 in related U.S. Appl. No. 12/986,528.

Opilnger et al., Enhancing Software Reliability with Speculative Threads, ASPLOS X Proceedings of the 10th international conference on Architectural support for programming languages and operating systems, Dec. 2002, pp. 184-196, San Jose, CA.

U.S. Office Action mailed Mar. 14, 2014 in related U.S. Appl. No. 13/020,228.

Narayanaswamy, G., et al., Impact of Network Sharing in Multi-Core Architectures, Computer Communications and Networks, 2008. ICCCN '08. Proceedings of 17th International Conference on Digital Object Identifier: 10.1109/ICCCN.2008.ECP.61, Publication Year: 2008, pp. 1-6.

Huang, W., et al., Efficient one-copy MPI shared memory communication in Virtual Machines, Cluster Computing, 2008 IEEE International Conference on Digital Object Identifier: 10.1109/CLUSTR. 2008.4663761, Publication Year: 2008, pp. 107-115.

Moreaud, S. et al., Optimizing MPI communication within large multicore nodes with kernel assistance, Parallel & Distributed Processing, Workshops and Phd Forum (IPDPSW), 2010 IEEE International Symposium on Digital Object Identifier: 10.1109/IPDPSW. 2010.5470849, Publication Year: 2010, pp. 1-7.

Rabenseifner, R. et al., Hybrid MPI/OpenMP Parallel Programming on Clusters of Multi-Core SMP Nodes, Parallel, Distributed and Network-based Processing, 2009 17th Euromicro International Conference on Digital Object Identifier: 10.1109/PDP.2009.43, Publication Year: 2009, pp. 427-436.

Lin et al., A Low-Complexity Synchronization Based Cache Coherence Solution for Many Cores, IEEE Ninth International Conference on Computer and Information Technology, 2009, pp. 69-75, DOI 10.1109/CIT.2009.100.

Huang et al., Architecture Supported Synchronization-Based Cache Coherence Protocol for Many-Core Processors, Institute of Computing Technology, Chinese Academy of Sciences, pp. 1-3, Beijing, China.

Santhanaraman Al., Natively Supporting True One-sided Communication in MPI on Multi-core Systems with InfiniBand, 9th IEEE/ACM International Symposium on Cluster Computing and the Grid, 2009, pp. 380-387.

Kontothanassis et al., Software Cache Coherence for Large Scale Multiprocessors, IP Accession No. N95-16113, Report No. AD-A281628, TR-513, Contract: N00014-92-J-1801; ARPA Order 8930, Jul. 1994.

Dios et al., Speeding-up Synchronizations in DSM Multiprocessors, Euro-Par 2006 Parallel Processing—12th International Euro-Par Conference, Proceedings, Lecture Notes in Computer Science (including subseries Lecture Notes in Artificial Intelligence and Lecture Notes in Bioformatics) (Lect. Notes Comput. Sci.), 2006, pp. 473-484, Germany.

Bolotin et al., The Power of Priority: NoC based Distributed Cache Coherency, Electrical Engineering Department, Technicon—Israel Institute of Technology (Haifa 32000, Isreal), 2007, pp. 1-10.

Nightingale et al., Parallelizing security checks on commodity hardware, Proceedings of the 2008 International Conference on Architectural Support for Programming Languages and Operating Systems (ASPLOS), Mar. 2008 URL http://www.eecs.umich.edu/~pmchen/papers/nightingale08.pdf.

Oplinger, Enhancing Software Reliability with Speculative Threads, 2004.

Li et al., Speculative Parallel Threading Architecture and Compilation, International Conference on Parallel Processing Workshops (ICPPW'05), 2005.

International Search Report mailed Mar. 27, 2012 in corresponding International Application No. PCT/US2011/061683.

Patil et al., "Efficient Run-Time Monitoring Using Shadow Processing" Proceedings of the International Workshop on Automated and Algorithmic Debugging (AADEBUG) (May 1995) pp. 119-132, reprint pp. 1-14.

\* cited by examiner

METHOD AND APPARATUS FOR A HIERARCHICAL SYNCHRONIZATION BARRIER IN A MULTI-NODE SYSTEM

CROSS REFERENCE TO RELATED APPLICATION

This application is a continuation of U.S. patent application Ser. No. 12/987,523, filed Jan. 10, 2011 the entire content and disclosure of which is incorporated herein by reference.

FIELD

The present application generally relates to computer architecture and more particularly to a synchronization barrier in a multi-node system.

BACKGROUND

In a multiprocessor system, synchronization between multi-nodes is frequently needed to synchronize all nodes. Synchronization is used to indicate that calculation on all nodes has reached a certain point. When synchronizing the nodes in a multi-node system, no node can continue processing until all nodes reach the synchronization point. This approach is used when, for example, partial results are calculated on all nodes in one phase of calculation, and then all partial results have to accumulate into a global result which is needed in the following phase of calculation. It is also used when successive phases of a calculation need to proceed in lock step across all nodes.

Each node in a multi-node system can have one or more processor cores. One or more processor cores can be located on the same chip (i.e., integrated circuit die). The organization of cores into nodes varies across machine architectures. Also, on a single processor core, one or more processing threads can be active. Sometimes a communication task (often MPI) is mapped to a single core, other times it may be mapped to multiple cores on a node, and still other times it may be mapped to the whole node. The scope of the present disclosure includes mechanisms that work regardless of the number of cores per node or the mapping communication tasks to cores.

On way to synchronize across all nodes in a multi-node system may proceed in two steps:
1) all cores within the chip are synchronized to ensure that all processing threads/cores on the chip have reached the synchronization point;
2) all chips within the system are synchronized.

Prior work implements this two-step synchronization process. In the first step, cores on a single chip are synchronized, and one core is assigned as the "winning" core. In the second step, intra-chip synchronization barrier is formed by synchronizing all "winning" cores on all chips.

An example of such system is the Blue Gene/P system, where lock box synchronization primitives are used to determine the winning core on a chip, and then inter-chip synchronization is achieved using a dedicated one bit network. The Blue Gene/Q system uses an improved and scalable mechanism to synchronize all cores on a chip, and synchronization between the chips is performed by using the system network and sending packets between the chips.

For a Cell chip, barrier synchronization between one master processor core PPE (power processing element) and eight accelerating processors cores SPEs (Synergistic Processing Elements) is implemented as a software program without using any dedicated hardware features to support synchronization. To achieve on-chip synchronization, all SPEs can add and write into the same memory location. The master processor on the chip, PPE can poll that memory location to determine when on-chip synchronization is achieved.

Other multi-node systems use a BSR (barrier synchronization register), where each processor has a one bit barrier write register. Logically, these all write bits form a single BSR register. All processors write into their bits, and all processors can read all the bits of the register. When a processor reaches barrier, it writes its barrier bit. All or only one processor polls on the all bits of the BSR register to determine whether the other processors reached synchronization. Barrier synchronization for on-chip and off-chip synchronization by using a BSR register introduces overhead to at least one processor, which needs to poll the BSR register until all processors reached the barrier. To poll a register, a number of instructions has to be to executed to determine that synchronization is achieved and communicate this status on-chip and/or off-chip, resulting in a power consuming, energy-inefficient system and causing long latency for synchronization. In addition, this approach requires asymmetric software implementation to be executed on various processors on the chip, even if all processors on the chip are identical.

BRIEF SUMMARY

A method for hierarchical barrier synchronization of cores and nodes on a multiprocessor system, in one aspect, may include providing by each of a plurality of threads on a chip, input bit signal to a respective bit in a register, in response to reaching a barrier; determining whether all of the plurality of threads reached the barrier by electrically tying bits of the register together and "AND"ing the input bit signals (AND is a Boolean logic function); determining whether only on-chip synchronization is needed or whether inter-node synchronization is needed; in response to determining that all of the plurality of threads on the chip reached the barrier, notifying the plurality of threads on the chip, if it is determined that only on-chip synchronization is needed; and after all of the plurality of threads on the chip reached the barrier, communicating the synchronization signal to outside of the chip, if it is determined that inter-node synchronization is needed.

An apparatus for a hierarchical barrier synchronization of cores and nodes on a multiprocessor system, in one aspect, may include a plurality of cores arranged in an integrated circuit. A register may be operable to store input bit signals received from each of said plurality of cores. A control logic circuit may be operable to electrically tie and perform a Boolean "AND" function on said stored input bit signals to determine whether said plurality of cores all achieved barrier. The control logic circuit may be further operable to determine whether only on-chip synchronization is needed or whether inter-node synchronization is needed, and in response to determining that all of the plurality of cores on the integrated circuit reached the barrier, the logic circuit may notify the plurality of cores on the chip, if it is determined that only on-chip synchronization is needed, and after all of the plurality of cores on the integrated circuit reached the barrier, the control logic circuit may communicate the synchronization signal to outside of the integrated circuit, if it is determined that inter-node synchronization is needed.

A computer readable storage medium storing a program of instructions executable by a machine to perform one or more methods described herein also may be provided.

Further features as well as the structure and operation of various embodiments are described in detail below with ref-

DETAILED DESCRIPTION

The present disclosure in one aspect describes a low-latency, low-overhead synchronization method which uses a symmetric software implementation for synchronizing nodes in a multiprocessor system. In the present disclosure, a node or chip refers to entity that is plugged into a socket and contains among other things computing cores. On a node are cores, or processor cores. On some architecture a core has one hardware thread; on other architecture the core may be an SMT (Symmetric Multi-Threaded) core and contain 2, 4, or possibly more hardware threads. Software threads get executed on top of the hardware thread. For the purposes of this document, thread is used to refer to hardware thread. In the event software thread is meant, the entire expression is written. A multiprocessor chip is referred to as a node. In another embodiment, a part of a chip can be referred to as a node, and a single chip can contain multiple nodes (or nodelets), which act as points of communication in the network of a multiprocessor system. In another aspect, the present disclosure provides a method for low-overhead, low-latency barrier synchronization of processor cores in a multiprocessor system. Within a single chip, processor cores or processing threads within a core write to a bit in a register. The bits of the register are electrically tied together and "AND"-ed to determine when barrier is achieved. Once all processor threads (in the event the architecture has threads) and cores on the chip reach the barrier, the synchronization signal indicating that synchronization is achieved becomes active. Briefly, barrier refers to a synchronization point in a program where a process or a thread needs to wait to be synchronized with others to reach the same point in processing before proceeding further.

If only on-chip synchronization of all cores or threads on the same chip is needed, the synchronization signal notifies all cores on this chip that the synchronization point is reached. Briefly, a core or a hardware thread has a capability to execute programs and may include a logical execution unit with L1 cache and functional units. If multiple nodes in a multiprocessor system need to be synchronized, the synchronization signal of the chip is communicated to other nodes in the multiprocessor system, and is hierarchically integrated into the system synchronization. The global synchronization signal is then propagated back to the lower levels of synchronization down to the cores or threads participating in the barriers.

In one embodiment of the present disclosure, a multiprocessor system includes a number of nodes, each node (also referred to as a chip) having one or more cores or threads. In this disclosure, the terms "node" and "chip" are used interchangeably. Within a node there are cores, and within a core there are hardware threads. In one embodiment, all processor chips are identical; examples of such systems are the Blue Gene™ systems, such as Blue Gene™/L, Blue Gene™/P or Blue Gene™/Q system from International Business Machines Corporation (IBM), Armonk, N.Y. In another embodiment, the multiprocessor system contains different processor chips. An example of such multiprocessor system with heterogeneous processor chips is the Road Runner system which contains AMD processor chips and IBM Cell processor chips.

In one embodiment, all processor cores of a processor chip are identical, forming a homogeneous system. In another embodiment, a processor chip has heterogeneous processors (also referred to as processor cores). In yet another embodiment, some processors on a processor chips are power efficient cores (some of which may be known as accelerators), where the levels of complexity of power efficient cores can vary. In one embodiment, only one process or only one thread can be executed on a single processor core. In yet another embodiment, a single processor core can execute multiple processes as processor threads.

Figure 1:
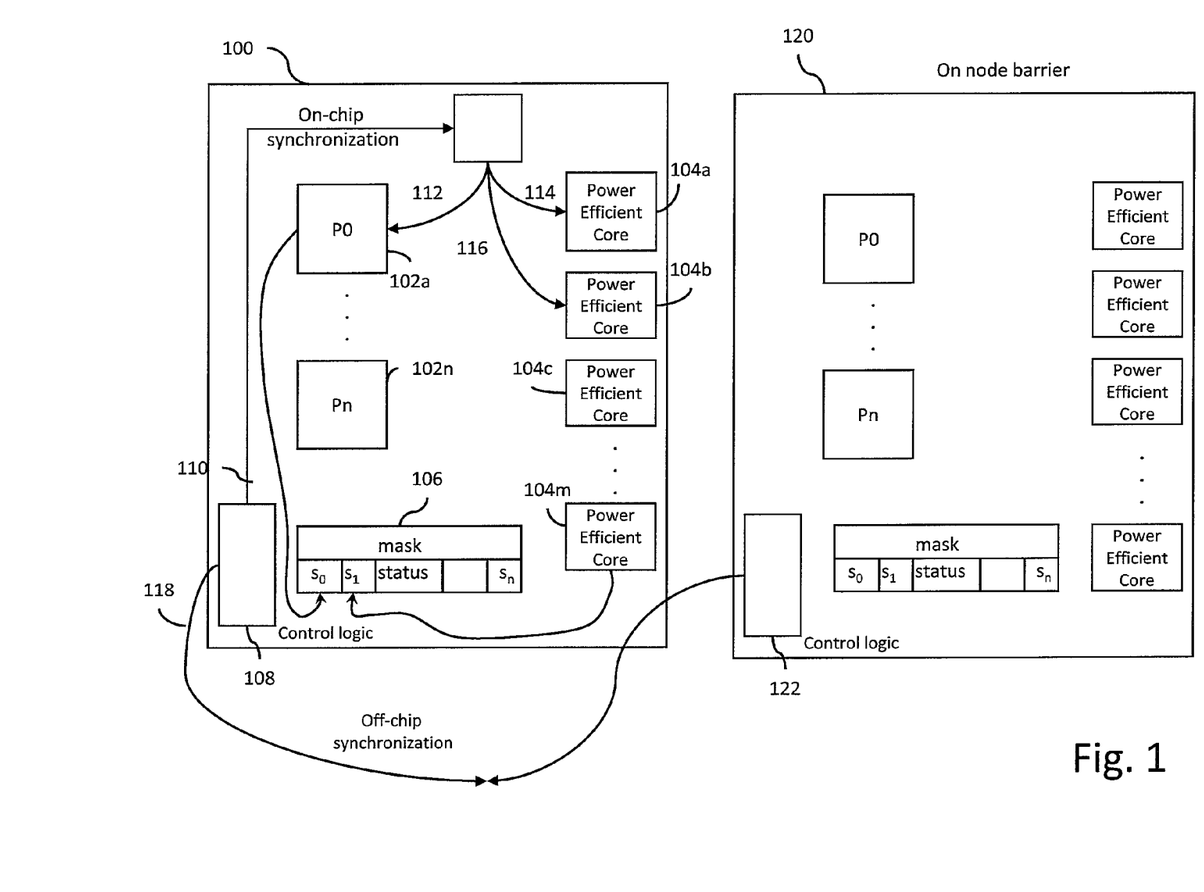
FIG. 1 illustrates a multiprocessor chip with heterogeneous processors in one embodiment of the present disclosure.

FIG. 1 illustrates a multiprocessor chip with heterogeneous processors in one embodiment of the present disclosure. The example chip 100 shown in FIG. 1 contains n processors (102a . . . 102n) and m power efficient cores (also known as accelerators) (104a, 104b, 104c, . . . 104m). The number and type of processing cores and power efficient cores on a chip do not limit the scope of this disclosure.

For each processor core or thread participating in the communication synchronization on the chip, one embodiment of the present disclosure implements a mask (also referred to as configuration) and a status register 106, where each participant in the synchronization has assigned mask and status bits. In one embodiment, each participant in the synchronization has assigned only one mask and one status bits. In another embodiment, each participant in the synchronization has assigned multiple mask and status bits. In yet another embodiment, a participant in the synchronization has assigned one or more mask and status bits, depending on the type of the participant, or on the configuration of the system. Without loss of generality, this mechanism, in another embodiment, could be extended to have mask bits for n software threads, which may be greater than the number of hardware threads.

In each of these cases, a control circuitry (control logic) 108 selects different configurations. In one embodiment, a participant in synchronization is hardwired to the same set of bits for mask/configuration selection and status indication bits. In another embodiment, the selection of the number of mask/configuration and status bits assigned to a participant is programmable, and can be modified by selecting the corresponding control logic configuration.

Figure 2:
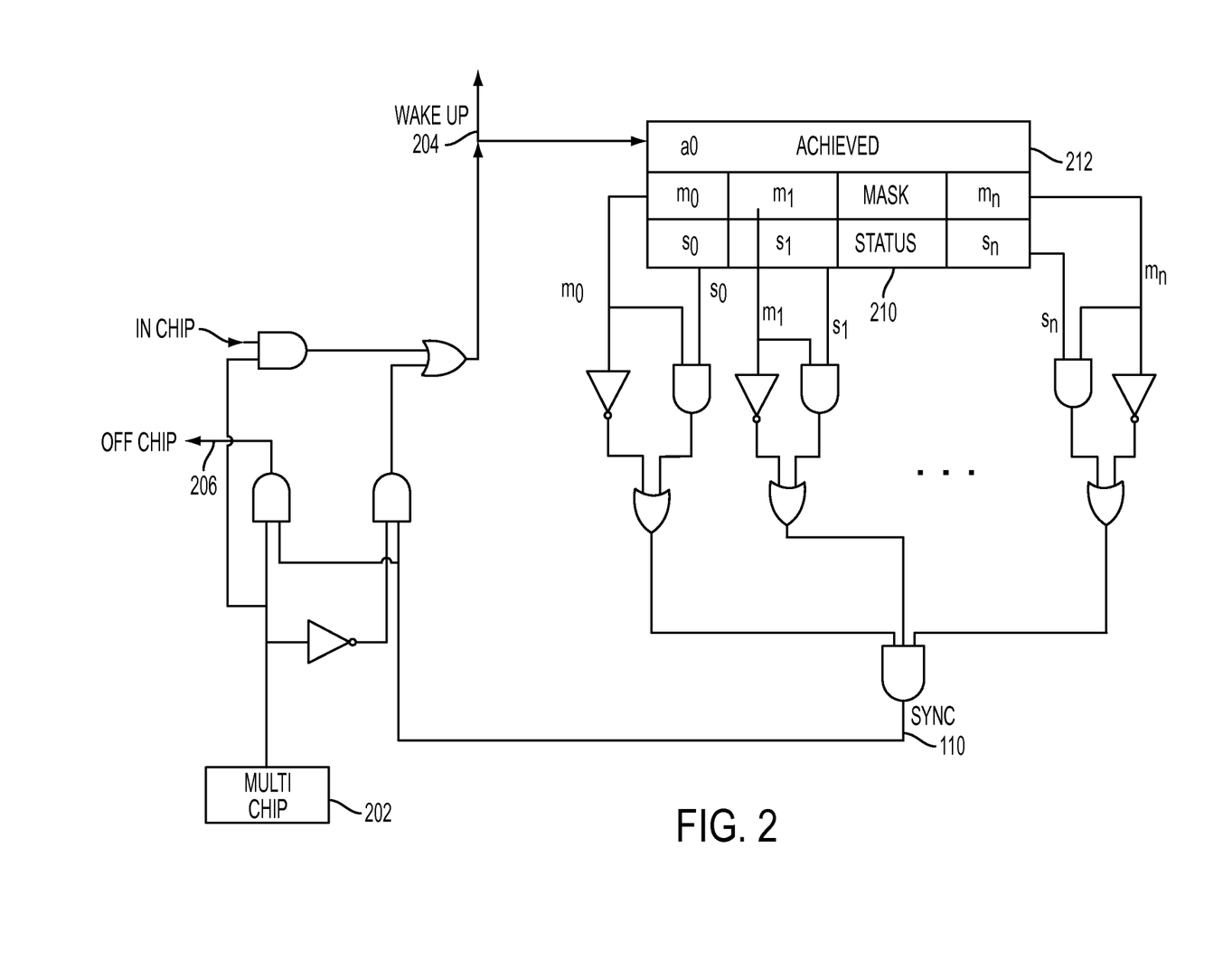
FIG. 2 illustrates an example logic gate in one embodiment of the present disclosure for identifying whether all participants in synchronization has reached the barrier.

In the case of one mask and one status bit per participant, the synchronization of the on-chip communication participants (i.e., synchronizing the participating cores and threads or the like on the same chip) may be done as follows:

set the mask bit if this processor core or communication participant should participate in the synchronization process;

set the status bit once that processor or communication participant reached the barrier;

the logic of the present disclosure in one embodiment identifies the case when all participants in synchronization process reach the barrier. This is done as illustrated in FIG. 2, by using the logic gates to identify whether processor core i is participating in the synchronization process (i.e., if m(i)=1), and if that is the case, if its barrier is reached (i.e., if $s(i)=1$), where $m(i)$ denotes a mask bit for the i-th processor core and $s(i)$ denotes a status bit for the i-th processor core. Once all processors who participate in synchronization have reached the barrier, a sync signal becomes active.

If all processors, threads or power efficient cores specified to participate in the synchronization, reached the synchronization barrier, a sync (synchronization) signal 110 becomes active. For this embodiment, all processors can execute the identical code, i.e., asymmetric software is not necessary as in the register polling approach. All processors reaching a barrier may, but are not required to go into sleep mode, where no further instructions are executed, and thus no further energy is spent, until the synchronization signal is received.

The sync signal 110 is used to communicate that the synchronization of all participants at that synchronization domain has been achieved. If only the processor cores within a single node should be synchronized, than this sync signal is fed directly to all synchronization participants on the chip as shown at 112, 114, and 116. In one embodiment of the present disclosure, programmable control logic 108 determines if the synchronization in that synchronization domain (chip, partition, etc.) is part of a larger domain, or isolated. Synchronization domain refers to a group of processor cores or chips that participate in a given synchronization instance. For example, a synchronization domain may be on-chip, meaning synchronizing processor cores of a chip. Synchronization domain may be off-chip, meaning synchronization with respect to processor cores on multiple chips.

If the synchronization domain is off-chip, a sync signal is sent outside the chip as shown at 118. For instance, the sync signal 118 may set a status bit corresponding to this chip in a similar mask and status bit register that is used for synchronizing the processor cores of two or more chips. Control logic 122 on another chip determines whether all participating processor cores on that chip 120 have reached the barrier and sends its sync signal to this mask and status bit register, wherein synchronization of chip 100 and chip 120 (and possibly others) may be synchronized in a similar manner to that of on-chip synchronization.

In another embodiment of the present disclosure, there may be multiple mask bits per each participant. In this way, a single participant can participate in multiple synchronization groups, by, for example, setting the mask bit for group 1 to 1 (on) to indicate that it is participating in the synchronization in group 1, and by setting the mask bit 2 for group 2 to 0 (off) to indicate that it does not participate in the synchronization in group 2. In this embodiment, a participant has allocated a number of m mask bits and a single status bit. This participant can participate in up to m different barriers simultaneously. For each of m barriers, its mask is combined with the status signal to determine if the participant reached the barrier. If a participant is participating in more than one barrier, each barrier is independent, i.e., the participant indicates that it has achieved each barrier. That barrier may or may not be at the same place in each participant's code. As the sequence for executing a barrier is for the participant to indicate it has arrived at a barrier and then at some point wait on that barrier, it is the responsibility of a thread participating in more than one barrier to ensure it has indicated arrival at each barrier before optionally sleeping or spinning. If it fails to do this, it is possible to induce deadlock on the system.

FIG. 2 illustrates example logic gate for identifying whether all participants in synchronization has reached the barrier. A mask and status register 210 includes a mask and status bits corresponding to a processor core or thread on a chip. In one embodiment, a bit may be allocated for each core on a chip. In that case, a core that is not participating in the synchronization has its corresponding mask bit is set to off so that it does not get checked. In one embodiment, a pair of mask and status bits is hardwired for every processor. If a processor does not participate in a barrier, its mask bit is set to 0 (do not participate). In another embodiment, mask and status bits can be configured to be allocated to each processor. The mask and status bits corresponding to each processor cores are input to the logic gates as shown. A configuration selection bit "MULTI CHIP" 202 is used to identify the type of synchronization (on-chip or off-chip). In one embodiment, the determination of which threads/cores are participants, and whether the synchronization is on or off chip is determined at barrier initialization time. For instance, if only one chip should be synchronized (i.e., on-chip synchronization), then the configuration selection bit "MULTI CHIP" 202 is set to 0, and the sync signal is fed back to processor cores as a "wake up" signal 204.

The "wake up" signal 204 may also trigger a bit to be set. This bit indicates that the other threads have achieved the barrier. The bit may be implemented in the mask and status register 210, for instance, as a separate row or entry 212 (referred to as achieved). The row 212 contains a bit that may be set by the wakeup signal indicating the other threads have achieved the barrier. The achieved row may be utilized in a mode where the wakeup unit (signal) sets this bit indicating the barrier has been achieved.

If multiple processor chips are to be synchronized, the configuration selection bit "MULTI CHIP" 202 may be set to 1, in which case the sync signal is not fed back to the processors on the chip, but instead are fed off the chip 206, to participate in synchronization of a larger communication domain. If this chip is part of a larger communication domain (the condition specified by the configuration bit "MULTI CHIP" 202), the method of the present disclosure propagates the synchronization signal out, otherwise the method of the present disclosure propagates the synchronization signal at that hierarchical level.

Figure 3:
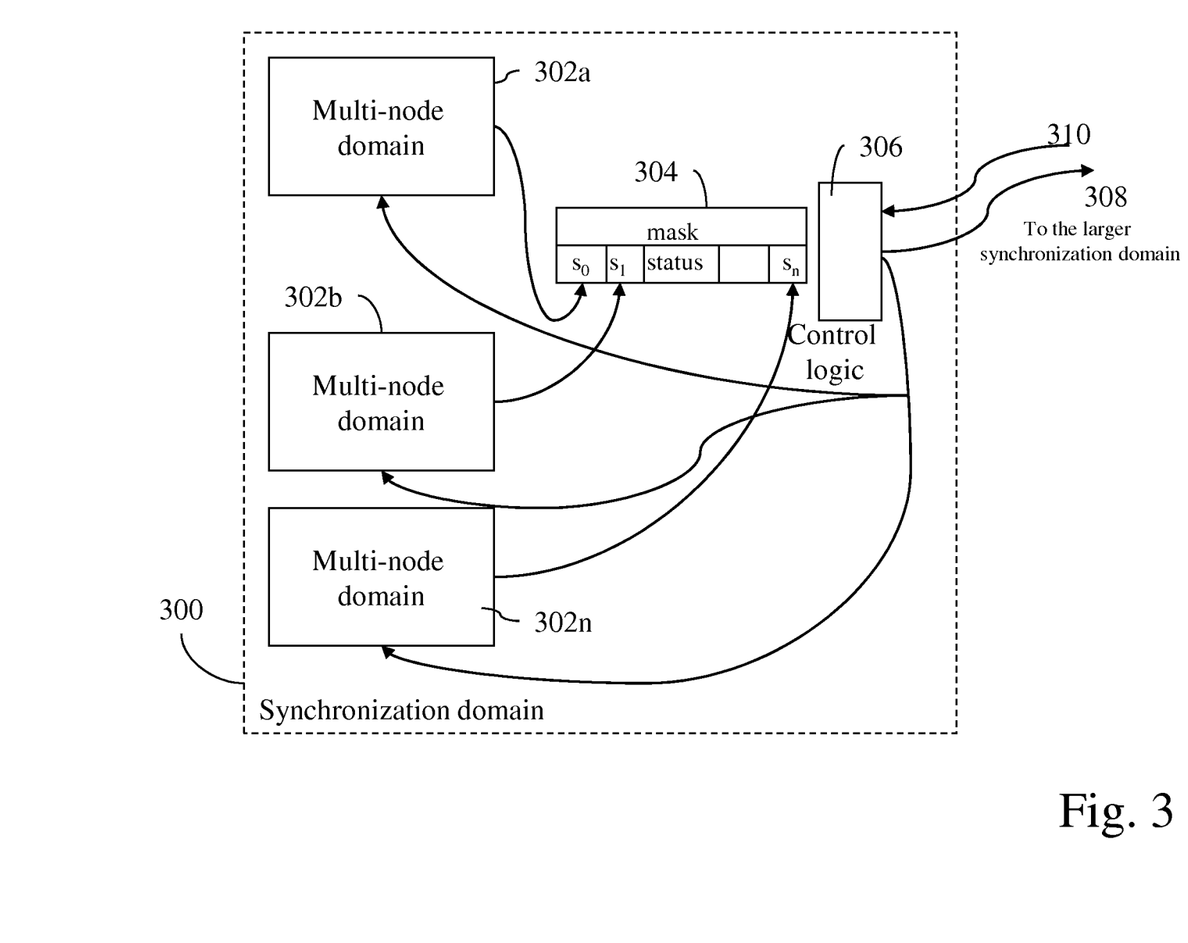
FIG. 3 shows synchronizing signals from multiple chips in one embodiment of the present disclosure.

FIG. 3 shows how synchronization signals from multiple chips (here "multi-node domains") are combined by using the mask and status bits in the way similar to the way the mask and status bits are used within a single chip. A synchronization domain 300 may include a plurality of multi-node domains (302a, 302b, . . . or 302n). A multi-node domain (e.g., 302a) includes a plurality of chips as shown in FIG. 1 at 100. Individual off-chip sync signals are generated and propagated by the control logic to the next hierarchical level, where the new set of mask and status bits is available as a part of control logic on the chip board, as a dedicated control chip, or as a combination there of. For example, the synchronization domain 300 may include a mask and status register 304. Each multi-node domain (e.g., 302a, 302b, . . . or 302n) has a mask bit and a status bit assigned in the mask and status register 304. An off-chip sync signal (e.g., FIG. 1 at 118; FIG. 2 at 206) from a multi-node domain would set a corresponding status bit in the mask and status register 304. A control logic 306 similar to the one shown in FIG. 2 detects the synchronization of all participating multi-node domains (e.g., 302a, 302b, . . . , 302n) in this synchronization domain 300.

If there are more synchronization domains to be synchronized, the control logic 306 transmits a sync signal to the next level of synchronization domain as shown at 308. In this case, after the synchronization of all desired levels of synchronization domains is reached, the control logic 306 would receive a sync signal back as shown at 310.

After reaching the desired synchronization of all participants, the control logic 306 back propagates the sync signal to each multi-node domain (e.g., 302a, 302b, . . . , 302n) as shown at 312. In turn, the control logic associated with each multi-node domain (e.g., 302a, 302b, . . . , 302n) transmits a sync signal to each of its participating processor cores and threads (e.g., shown at FIG. 1 at 110).

Nodes may be arranged hierarchically, and at each hierarchical level, a synchronization point is achieved. After all participants at that hierarchical level reach the synchronization point (or in response to all participants at that hierarchical level reaching the synchronization point), the synchronization signal is generated. If there is a higher synchronization level, the synchronization signal is propagated to the next higher hierarchical synchronization level. If no higher hierarchical synchronization levels exist, the synchronization signal is propagated back to the next lower level of synchronization domains. Each lower hierarchical level propagates the synchronization signal to all participants at that synchronization level. If no lower level of synchronization domain exists, i.e., the synchronization signal has propagated back to the chip level, the synchronization signal is sent to the participants as a "wake up" signal, as described in the case of a single chip synchronization.

In one embodiment of the present disclosure, synchronization within a level as well as signal propagation from level to level is performed electrically. As soon as the electrical signal within a level has propagated indicating all participants at this level have achieved the barrier, the signal is propagated to the next level to participate in that level. Because in this embodiment, the entire barrier across the whole machine down to each individual thread is based on electrical propagation, high performance is achieved.

Software Interface

In one embodiment, a software interface may use memory-mapped I/O (MMIO) write and reads to initialize and utilize the barrier mechanism. In this embodiment, reads and writes to specially mapped memory addresses achieve the behavior of the below software interfaces. The present disclosure also implements, in another embodiment, an extension to instruction set architecture (ISA) that enables software to interface with the above-described hardware implementation. Thus, new instructions are introduced in the present disclosure. A list of the new ISA instructions in one embodiment of the present disclosure is provided below. This is not an extensive list of all possible new instructions associated with the present invention, and the exact operation or syntax of these instructions do not limit the scope of the present invention:

- set_barrier—to indicate that the program will participate in the communication barrier; this causes the mask bit associated with this processor core to be set.
- wait_poll—to indicate that the thread has arrived at the barrier. At some point the bit associated with the thread to indicate the barrier has been achieved will be set. In this mode it is the responsibility of the thread to check the bit indicating the other threads have achieved the barrier.
- wait_interrupt—to indicate that the thread has arrived at the barrier and may continue executing instructions. At some point the thread will receive an interrupt indicating that all its co-participants have also arrived at the barrier. At this point the thread may execute code succeeding the barrier.
- wait_wakeup—to indicate that the thread enters the barrier and goes into sleep status until the wakeup signal on this processor becomes active. This may be chosen to be implemented efficiently with hardware or in software as per the goals of the target architecture.

An example way of using these instructions in one embodiment of the present disclosure is as follows. A program starts by initializing the barrier. This involves all the threads that wish to participate in the issuing a set-barrier command with a predetermined barrier identifier (id) to indicate that this thread is going to participate in the multi-node synchronization. The barrier id allows the hardware to form the correct grouping of threads. This synchronization may be on-chip or intra-chip synchronization depending on which threads have issued the set-barrier command. Issuing this command causes the mask bit associated with this thread executing the program to be set up. The thread continues to execute instructions of the program.

Once the thread completes the execution of instructions for a given phase of the program and reaches the barrier, it issues a wait_wakeup or wait_interrupt instructions, to check if other processors reached the barrier. This command causes the barrier signal to start propagating out to other threads participating in the barrier. At some point all the threads arrive at the barrier and the logic determines this and then start propagating back the sync signal to all the participating.

Figure 4:
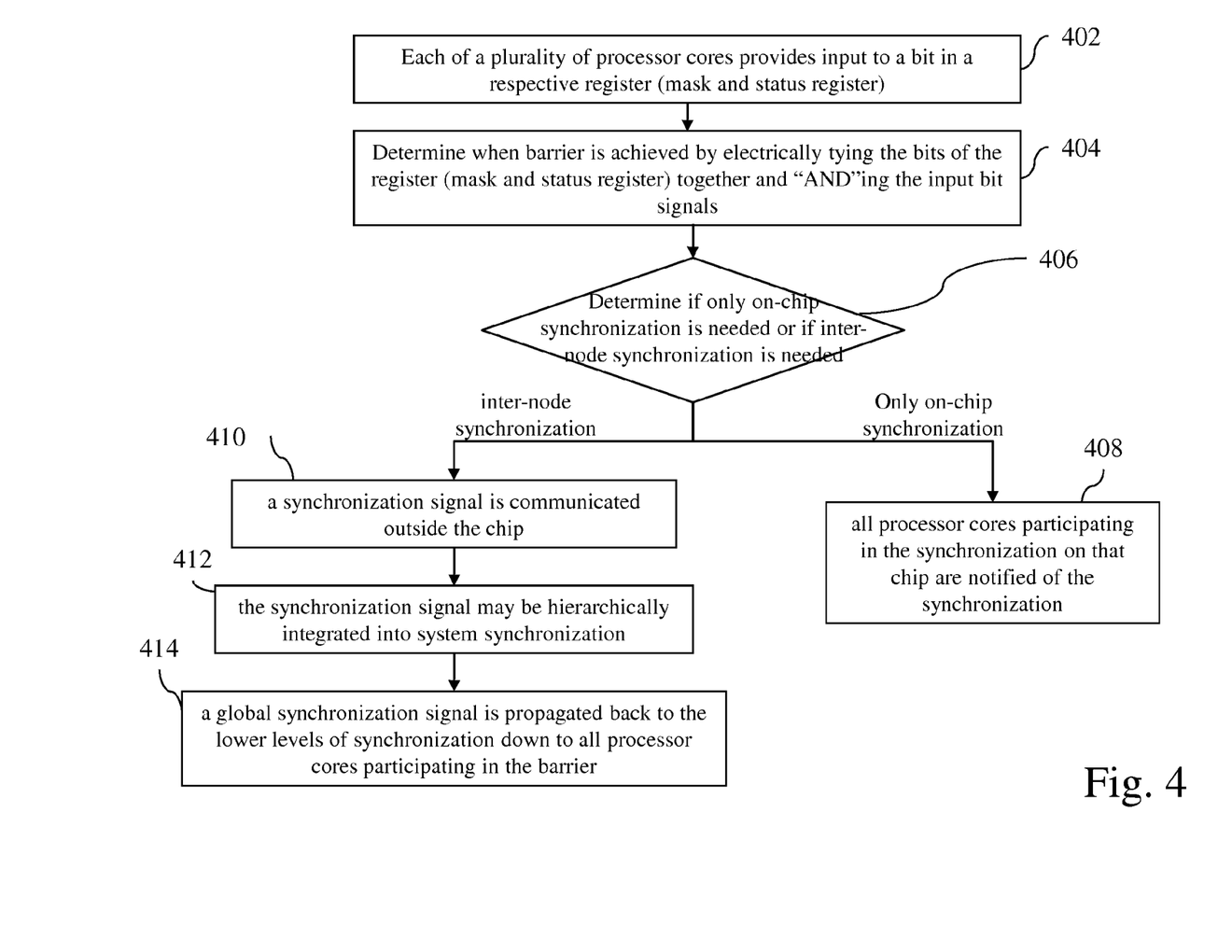
FIG. 4 is a flow diagram illustrating a method of the present disclosure in one embodiment.

FIG. 4 is a flow diagram illustrating a method for low-overhead, low-latency barrier synchronization of cores and nodes on a multiprocessor system in one embodiment of the present disclosure. At 402, each of a plurality of processor cores provides input to a respective bit in a register (referred to above as a mask and status bit register). In one aspect, multiple processor cores on the processor chip may be heterogeneous, i.e., a processor core on the chip may comprise different functional units and/or functionalities from another processor core on the same chip. At 404, the method in one embodiment determines whether and/or when barrier is achieved using a logic circuit that electrically ties the bits of the barrier register (mask and status register) together and "AND"s the input bit signals. At 406, the method in one embodiment determines if only on-chip synchronization is needed or if inter-node synchronization is needed. At 408, once all processors on the chip achieve the barrier and if only on-chip synchronization is needed, all processor cores participating in the synchronization on that chip are notified of the synchronization, for instance, by activating a synchronization signal and transmitting the sync (synchronization) signal to the threads.

At 410, if inter-node synchronization is needed, a synchronization signal is communicated outside the chip, for instance, to synchronize multiple processor chips. In one aspect, the processor chips are heterogeneous, i.e., one or more processor chips may have different architecture and/or functionalities from another processor chip participating in the inter-node synchronization.

At 412, the synchronization signal may be hierarchically integrated into system synchronization, for instance, as described with reference to FIG. 3. At 414, a global synchronization signal is propagated back to the lower levels of synchronization down to all processor cores participating in the barrier. As per the different modes illustrated in FIG. 5, one of three actions may be taken when the sync signals arrives back at the node indicating all threads have achieved the barrier.

Figure 5:
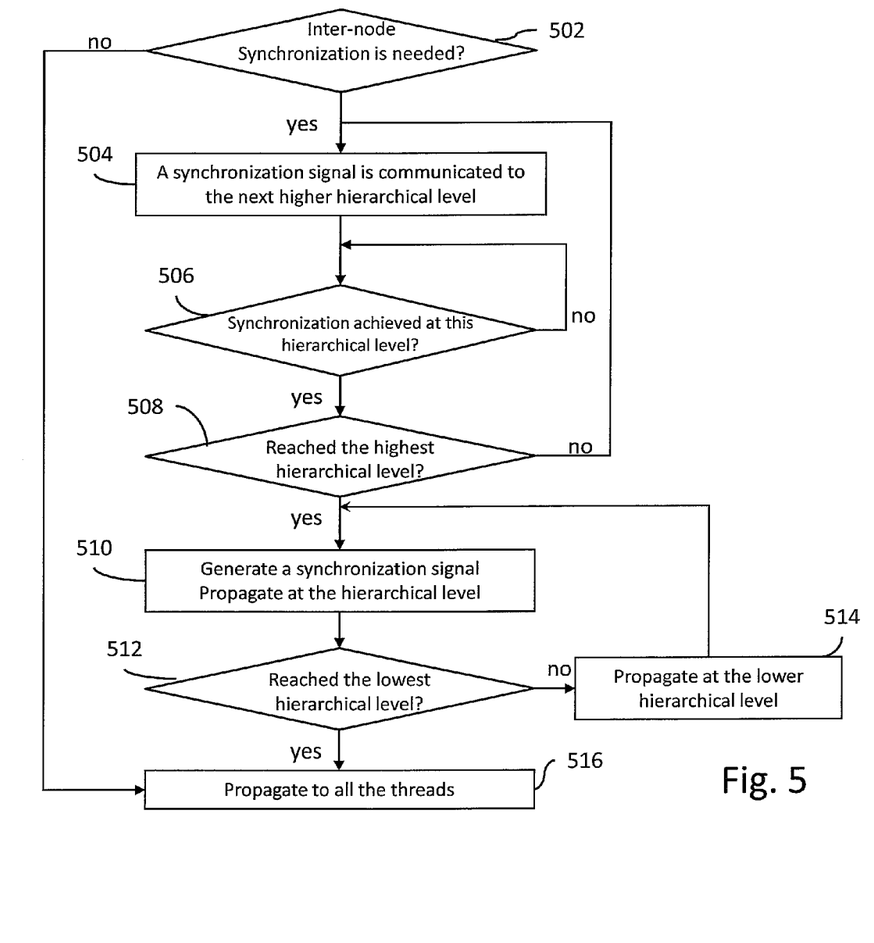
FIG. 5 is a flow diagram illustrating synchronization in one or more chips in hierarchical manner, in one embodiment of the present disclosure.

FIG. 5 is a flow diagram illustrating synchronization in one or more chips in hierarchical manner, in one embodiment of the present disclosure. A hierarchical synchronization arrangement of the present disclosure in one embodiment may include, at a low level, a plurality of processor cores or threads on a chip participating in barrier synchronization. Each chip may include a mask and status bit register and a control logic that determines whether all participating processor cores on that node have reached a barrier. The next level of synchronization may include multiple nodes participating in the barrier synchronization. This level also may include a similar mask and status bit register and control logic that determines whether all participating chips have reached the barrier. Yet another level of synchronization hierarchy may include yet another group of chips participating in the barrier synchronization and so forth. At each level of synchronization hierarchy, there may be a mask and status bit register and a control logic that determines whether all participants in that level have reached the barrier.

At 502, it is determined whether inter-node synchronization is needed. If not, at 516, a synchronization that indicates that all threads participating in barrier on a node is sent to the threads on that node.

In the case in which there are multiple levels of synchronizations, i.e., two or more levels, the control logic at each level transmits the synchronization signal to the next hierarchical level, once synchronization is achieved at that level; when synchronization is reached at the end of the hierarchy, the synchronization signal may be back propagated, i.e., transmitted back to a lower levels of hierarchy all the way to the lowest level.

For example, at 504, a synchronization signal is communicated to the next higher hierarchical level. At 506, it is determined whether synchronization is achieved at that hierarchical level. If synchronization has been achieved, at 508, it is determined whether another hierarchical level of synchronization is needed. If so, a synchronization signal is sent to that level of hierarchy at 504, and the process may continue until synchronization is communicated to all hierarchical levels. At 508, if it is determined that the highest hierarchical level is reached, a synchronization signal is generated and propagated at a lower level at 510. At 512, if there are more nodes in lower levels of hierarchy waiting for synchronization, (i.e., the back propagation of signals in the levels of hierarchy has not reached a node or nodes in the lowest level of hierarchy), at 514, a synchronization signal is propagated at the lower hierarchical level. The steps 510, 512 and 514 may continue until a synchronization signal is propagated back to the lowest hierarchy level of node or nodes. At 516, a synchronization signal is propagated to all threads in the node or nodes at the lowest hierarchy level. In one embodiment of the present disclosure, the determination is done electrically at all levels, and thus efficiency of propagation is achieved.

Unlike some of known techniques that use write and read registers to determine barrier synchronization, a thread in the present disclosure in one embodiment need not poll on a read register or the like to identify if other threads are in the barrier or reached synchronization. Furthermore, because the threads in the present disclosure in one embodiment need not poll on a read register, a separate read registers and interconnects for status transfer from a write register to a read register for all processors may not be needed. Instead, the present disclosure in one embodiment may utilize a write register for, where each thread writes its status. When the synchronization of the system is reached, a signal is generated (a wake-up or interrupt signal) and broadcasted to all participants in the synchronization. A hierarchical organization of the present disclosure also allows for inclusion of many threads in the synchronization.

The present disclosure in one embodiment also allows for programmable selection for each thread as to whether it is participating in the barrier, independently of the code the threads are executing whether the same or different code. As described above, this selection may occur at initialization by executing a set-barrier command with a given barrier identifier.

Yet in another aspect, the present disclosure in one embodiment need not have software intervention to poll thread state. Rather, in the present disclosure in one embodiment, electrical signals are propagated in hardware to signal the barrier synchronization. The present disclosure in one embodiment operates on a multi-core heterogeneous chip and allows for efficiently feeding a barrier signal from on chip to a hardware device, and propagating the barrier signal efficiently, for instance without software checking, back to each thread on the multi-core system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A non-transitory computer readable storage medium storing a program of instructions executable by a machine to perform a method for a hierarchical barrier synchronization of cores and nodes on a multiprocessor system, comprising:
   providing a mask bit register and a status bit register for each of a plurality of threads on a chip;
   receiving from a thread on the chip, an input bit signal to the status bit register associated with the thread, in response to reaching a barrier;
   for each of the plurality of threads,
      "AND"ing at least the input bit signal with a mask signal stored in the mask bit register associated with the thread to produce a first output, and
      "OR"ing at least an inverted mask signal associated with the thread with the first output to produce a second output;
   determining whether all participants in synchronization process reached the barrier by "AND"ing the second outputs associated with the plurality of threads;
   determining whether only on-chip synchronization is needed or whether inter-node synchronization is needed;
   in response to determining that all of the participants on the chip reached the barrier, notifying the participants on the chip if it is determined that only on-chip synchronization is needed; and
   after all of the participants on the chip reached the barrier, communicating the synchronization signal to outside of the chip if it is determined that inter-node synchronization is needed.

2. The non-transitory computer readable storage medium of claim 1, wherein the plurality of threads on the chip are heterogeneous wherein at least one of the plurality of threads is a component of a power efficient core and another of the plurality of threads is a component of a processing core.

3. The non-transitory computer readable storage medium of claim 1, wherein the notifying the plurality of threads includes generating an interrupt, waking up one or more of the plurality of threads, or setting a bit indicating the barrier has been achieved, or combinations thereof.

4. The non-transitory computer readable storage medium of claim 1, further including:
   in response to determining that the inter-node synchronization is needed, hierarchically integrating the synchronization signal into a system synchronization; and
   propagating a global synchronization signal back to one or more lower levels of synchronization down to all threads participating in the barrier.

5. The non-transitory computer readable storage medium of claim 4, wherein a plurality of thread chips participate in the system synchronization and the plurality of thread chips are heterogeneous.

6. The non-transitory computer readable storage medium of claim 1, wherein said each of a plurality of threads on a chip is programmed to sleep after providing the input bit signal.

7. The non-transitory computer readable storage medium of claim 6, wherein said notifying the plurality of threads on the chip wakes up said each of a plurality of threads on a chip.

8. An apparatus for a hierarchical barrier synchronization of cores and nodes on a multiprocessor system, comprising:
   a plurality of cores arranged in an integrated circuit;
   a status bit register and a mask bit register associated with a core, for each of the plurality of cores;
   the status bit register operable to store input bit signals received from each of said plurality of cores;
   a control logic circuit operable to perform a Boolean "AND" function on the input bit signal and a mask signal stored in the mask bit register associated with a core to produce a first output for each of the plurality of cores, and perform a Boolean "OR" function on an inverted mask signal associated with the core and the first output to produce a second output for each of the plurality of cores,
   the control logic circuit further operable to perform a Boolean "AND" function on the second outputs associated with the plurality of cores to determine whether said plurality of cores participating in synchronization process all reached barrier,
   the control logic circuit further operable to determine whether only on-chip synchronization is needed or whether inter-node synchronization is needed, and in response to determining that all of the plurality of cores on the integrated circuit participating in the synchronization process reached the barrier, notifying the plurality of cores on the chip if it is determined that only on-chip synchronization is needed, and after all of the plurality of cores on the integrated circuit participating in the synchronization process reached the barrier, communicating the synchronization signal to outside of the integrated circuit if it is determined that inter-node synchronization is needed.

9. The apparatus of claim 8, wherein the plurality of cores on the integrated circuit are heterogeneous.

10. The apparatus of claim 8, wherein the notifying the plurality of cores on the integrated circuit includes transmitting a synchronization signal to said each of a plurality of cores on the integrated circuit.

11. The apparatus of claim 8, further including:
in response to determining that the inter-node synchronization is needed, hierarchically integrating the synchronization signal into a system synchronization; and
propagating a global synchronization signal back to one or more lower levels of synchronization down to all cores participating in the barrier.

12. The apparatus of claim 11, wherein a plurality of integrated circuits participate in the system synchronization and the plurality of integrated circuits are heterogeneous.

13. The apparatus of claim 8, wherein said each of a plurality of cores in the integrated circuit is programmed to sleep after providing the input bit signal.

14. The apparatus of claim 13, wherein said notifying the plurality of cores in the integrated circuit wakes up said each of a plurality of cores participating in the synchronization process.

15. The apparatus of claim 14, further including instruction set architecture that includes an instruction to set a barrier and an instruction to wake up one or more cores.

16. The apparatus of claim 8, wherein the mask bit register stores an indication of whether the corresponding core is participating in barrier synchronization.

* * * * *